J., W. H. & E. R. WILLIAMS.

DISINFECTOR AND DEODORIZER.

APPLICATION FILED APR. 21, 1911.

Reissued Nov. 14, 1911.

13,314.

2 SHEETS—SHEET 1.

WITNESSES:

Fred H. Miller

W. C. Lyon

INVENTORS.

Joseph Williams

William H. Williams and Edward R. Williams

By Fredk H. Winter,

Atty.

COLUMBIA PLANOGRAPH CO., WASHINGTON, D. C.

J., W. H. & E. R. WILLIAMS.

DISINFECTOR AND DEODORIZER.

APPLICATION FILED APR. 21, 1911.

Reissued Nov. 14, 1911.

13,314.

2 SHEETS—SHEET 2.

WITNESSES:

Fred H. Miller

W. C. Lyon

INVENTORS

Joseph Williams,
William H. Williams,
and Edward R. Williams,
By Fred'k H. Winter
Atty.

COLUMBIA PLANOGRAPH CO., WASHINGTON, D. C.

UNITED STATES PATENT OFFICE.

JOSEPH WILLIAMS, WILLIAM H. WILLIAMS, AND EDWARD R. WILLIAMS, OF SHARPSBURG, PENNSYLVANIA.

DISINFECTOR AND DEODORIZER.

13,314. Specification of Reissued Letters Patent. Reissued Nov. 14, 1911.

Original No. 977,353, dated November 29, 1910, Serial No. 565,913. Application for reissue filed April 21, 1911. Serial No. 622,625.

*To all whom it may concern:*

Be it known that we, JOSEPH WILLIAMS, WILLIAM H. WILLIAMS, and EDWARD R. WILLIAMS, citizens of the United States, residing at Sharpsburg, in the county of Allegheny and State of Pennsylvania, have invented new and useful Improvements in Disinfectors and Deodorizers, of which the following is a specification.

Our invention relates to disinfectors and deodorizers, and one of its objects is to provide a receptacle with positive and reliable means for automatically and intermittently discharging the contents thereof.

A further object of the invention is to provide novel means for supporting a receptacle containing disinfectants and deodorants.

The above and such other objects as may hereinafter appear are attained by the novel construction, combination and arrangement of parts to be hereinafter specifically described and then claimed.

Reference will now be had to the drawings forming a part of this specification, wherein:—

Figure 1:
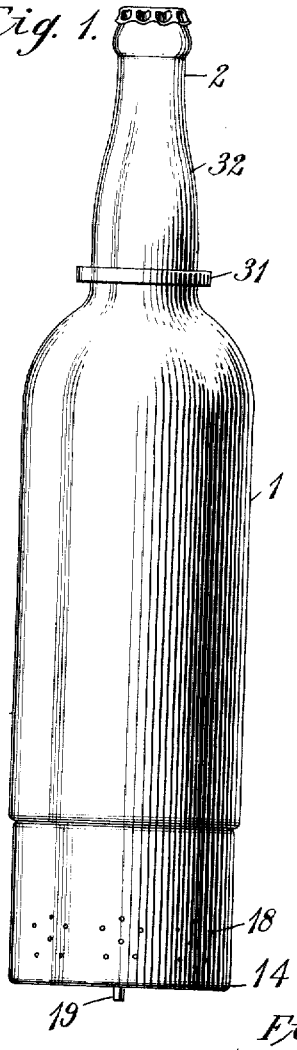
Figure 2:
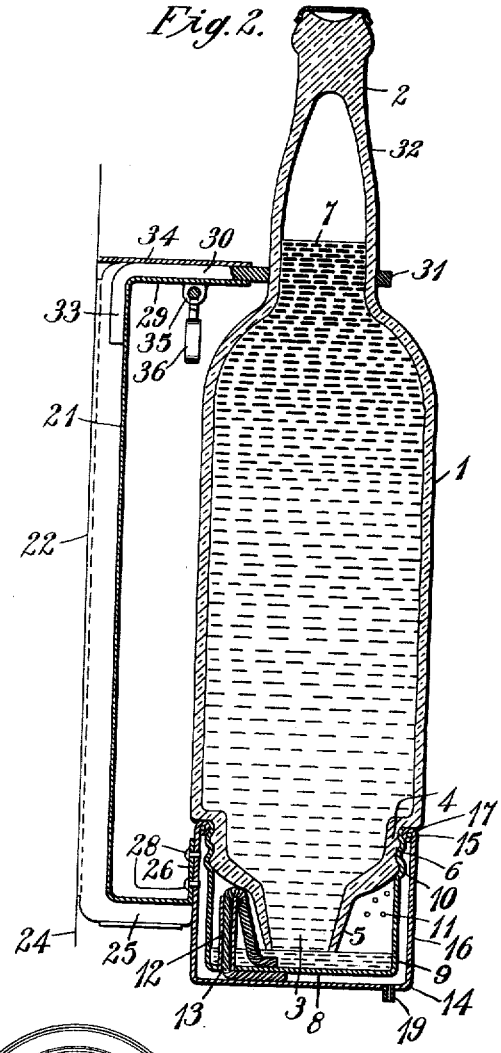
Figure 3:
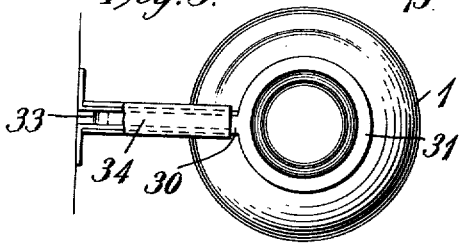
Figure 4:
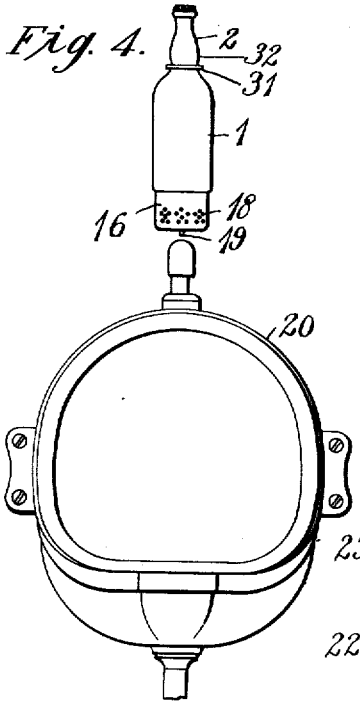
Figure 5:
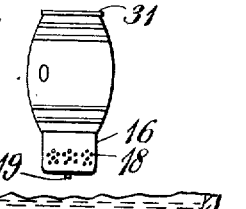
Figure 7:
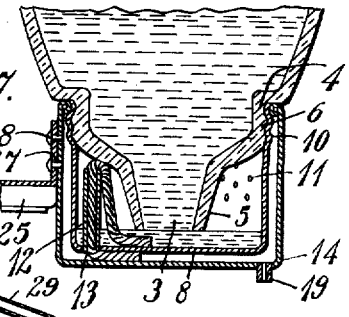
Figure 8:
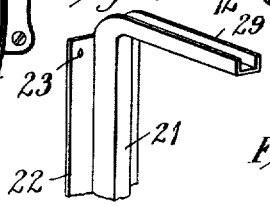
Figure 9:
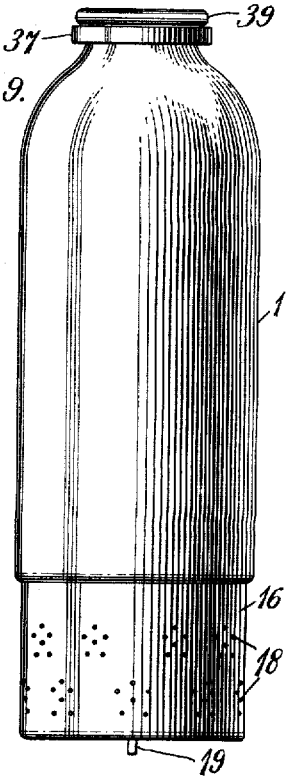
Figure 6:
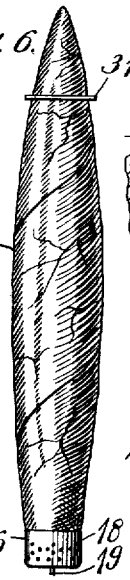
Figure 10:
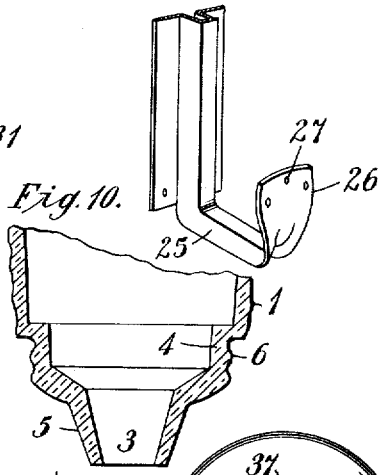
Figure 12:
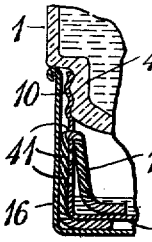
Figure 11:
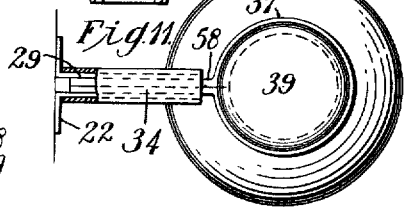

Figure 1 is a front elevation of our disinfector and deodorizer; Fig. 2 is a vertical sectional view of the same; Fig. 3 is a plan view of the disinfector and deodorizer, partly broken away and partly in section; Fig. 4 is a front elevation of the disinfector and deodorizer in position above a urinal, the disinfector and deodorizer having the shape of a bottle; Fig. 5 is a front elevation of the disinfector and deodorizer having the shape of a keg or barrel; Fig. 6 is a similar view of the disinfector and deodorizer having the shape of a cigar; Fig. 7 is an enlarged vertical sectional view of the lower portion of the disinfector and deodorizer having the contour of a barrel; Fig. 8 is a perspective view of a portion of a bracket adapted to support the disinfector and deodorizer; Fig. 9 is an enlarged front elevation of a modified form of receptacle for disinfectants and deodorants; Fig. 10 is a vertical sectional view of a portion of the receptacle having a contour similar to a cigar; Fig. 11 is a plan of a modified form of retaining ring; and Fig. 12 is a vertical sectional view of a portion of a modified form of inner cup.

Like numerals of reference denote corresponding parts throughout the several views of the drawings.

The reference numeral 1 denotes a disinfectant and deodorant receptacle having a contour similar to that of a bottle. The receptacle is made of bottle shape in order to employ the same as an advertising medium for well known brands of liquids or other products and to provide the receptacle with labels or other advertising matter, thus giving the receptacle and its contents the appearance of any one of a variety of well known articles of commerce. It is with a similar object in view that the receptacle is made similar in shape to a keg or barrel, as shown in Fig. 5 or similar in shape to a cigar, as shown in Fig. 6.

The upper end 2 of the receptacle 1 is closed and the lower end thereof is provided with a central outlet 3 that is formed by reducing the lower portion of the receptacle 1 at 4 and at 5, the first reduction in the diameter of the receptacle providing an annular wall 6 that is inset from the periphery of the receptacle 1 and is threaded for a purpose that will presently appear. The second reduction 5 forms the outlet 3 and provides clearance for a wick casing and wick that are used in connection with the receptacle.

7 denotes a disinfectant and deodorant liquid that is within the receptacle 1 and is retained therein by an inner cup 8 having its peripheral wall 9 threaded at the upper edge 10, whereby it can be screwed upon the threaded annular wall 4 of the receptacle. The wall 9 of the cup 8 is perforated or apertured at 11, above the outlet 3 of the receptacle 1.

12 denotes a vertical wick casing carried by the bottom of the cup 8, contiguous to the wall 9 thereof, said wick casing having both ends thereof open, with the upper end in proximity to the reduced lower end of the receptacle 1. In the wick casing 12 is a portion of a wick 13 that extends into the cup 8 and to the bottom thereof in order that the contents of the cup 8 may be conveyed therefrom by capillary attraction.

14 denotes an outer cup of a depth and diameter greater than the cup 8 and of a less diameter than the receptacle 1, whereby the receptacle may be supported upon the upper edge 15 of the peripheral wall 16 of said cup, the receptacle being supported by an annular shoulder 17 that is formed by reducing the lower end of the receptacle at 4. The wall 16 of the cup 14 is perforated or apertured at 18 and its bottom, adjacent to the wall thereof, may be provided with an open drip tube 19, this tube being preferably arranged at a point remote from the lower end of the wick casing 12, thus preventing the insertion of a match, pin or other device into the drip tube to tamper with the wick.

To support the receptacle 1 and its cups above a urinal 20, a basin or any other structure or place to be disinfected and deordorized, a bracket may be employed. The bracket is preferably made of channel shaped metal and comprises a vertical body 21 having lateral side flanges 22 extending from end to end thereof and provided with apertures 23 to receive screws, nails or other fastening means. The lower end of the body 21 terminates in an outwardly projecting arm 25 having its end 26 shaped and bent upwardly and provided with apertures 27 whereby it can be secured to the side of the outer cup 14 by rivets 28 or other fastening means. The upper end of the body 21 terminates in an outwardly extending support 29 adapted to receive the angle arm 30 of a ring or collar 31 that is mounted upon the neck 32 of the receptacle 1. The end 33 extends downwardly into the body 21 of the bracket and the arm is retained in the support 29 by an inverted channel shaped keeper 34 having depending apertured and oppositely disposed lugs 35 adapted to be connected beneath the support 29 by a padlock or seal 36. In lieu of the ring or collar 31, a split ring 37 may be used having the ends thereof provided with arms 58, as shown in Fig. 11.

In Fig. 9 of the drawings, another form of receptacle 1 is shown wherein the neck is provided with a rim 39 and, adapted to engage under this rim, is a split ring 37, the ring being sprung over the upper end of the receptacle.

When our device is used as a deodorizer of the atmosphere only, the wick 13 or the drip tube 19 may be dispensed with, but we prefer to dispense with the drip tube and deodorize the atmosphere by the process of evaporation which is effected through the cup perforations.

Whatever may be the form of the receptacle, we prefer to make it of glass, as is indicated in each of Figs. 2, 7, 10, and 12.

In Fig. 12 of the drawings is shown a structure in which the wick casing 12 is dispensed with and communication between the cups is had by means of a plurality of openings 41 in the side wall of the inner cup to receive the wick 13 for conveying the contents of the inner cup into the outer cup. Since the openings 41 are at different heights, the flow of fluid may be regulated by changing the wick from one opening to another.

From the foregoing it will be observed that the receptacle 1 constitutes a reservoir, and the lower portion of said reservoir is provided with an nner and an outer cup, the former retaining the contents of the reservoir in position to be fed by capillary attraction to the latter, and the outer cup serving functionally to facilitate evaporation by maintaining a shallow body of liquid therein, and as a means for preventing tampering with the wick, and also as a support for the receptacle or reservoir. The atmosphere is deodorized by the process of evaporation at the same time that the urinal is being disinfected through the constant dripping of the disinfectant from the drip tube 19. It will be noted that, by reason of the location of the wick casing 12 at a point remote from the drip tube 19, the disinfectant must travel some distance or across the bottom of the outer cup and, consequently, there will be a shallow quantity therein. On account of the small quantity of liquid in the outer cup and the circulation of air therethrough, it is unnecessary to use evaporating wicks or padding.

Having now described our invention, what we claim as new, is:—

1. A device for the purpose set forth comprising a receptacle having substantially all of its outer surface exposed and having a bottom outlet, an inner cup surrounding the lower portion of the receptacle, an outer cup surrounding said inner cup, means for transferring liquid from the inner cup to the outer cup and supporting means arranged to engage the outer cup and the upper portion of the receptacle to support the latter.

2. A device for the purpose set forth comprising a receptacle having substantially all of its outer surface exposed and having a bottom outlet, an inner cup surrounding the lower portion of the receptacle and detachably fastened to the periphery thereof, an outer cup surrounding said inner cup and arranged to support said receptacle, means for transferring liquid from the inner cup to the outer cup and supporting means connected to the outer cup and arranged to support the receptacle at its upper portion.

3. A device for the purpose set forth comprising a glass receptacle for liquid having a bottom outlet, an inner cup surrounding the lower portion of the receptacle and making coöperative engagement with the periphery of the receptacle above the outlet, a perforated outer cup surrounding said inner cup, and means for transferring liquid from the inner cup to the outer cup.

4. A device for the purpose set forth comprising a receptacle for liquid having a peripheral screw thread and a bottom outlet, an inner cup adapted to engage said peripheral screw, an outer cup surrounding said inner cup, means for transferring liquid from the inner cup to the outer cup, and a supporting means for said members.

5. A device for the purpose set forth comprising a glass receptacle having a bottom outlet, a perforated inner cup surrounding the lower portion of said receptacle and engaging the periphery of the receptacle above the outlet, a perforated outer cup surrounding said inner cup and having a liquid outlet, means for conveying liquid from the inner cup to the outer cup, and a supporting means for said members.

6. A device for the purpose set forth comprising a glass receptacle having a bottom outlet, an inner cup fitted upon the periphery of the lower portion of the receptacle to inclose said outlet and having an air opening, an outer cup surrounding the inner cup and having air openings and means for discharging liquid, and means for transferring liquid from the inner cup to the outer cup.

7. A device for the purpose set forth comprising a receptacle having a bottom outlet, an inner cup removably attached to the lower portion of said receptacle and having a plurality of side openings, an outer cup surrounding said inner cup and having means for discharging liquid and means for the passage of air, and a wick connecting the two cups through one of the side openings of the inner cup.

8. A device for the purpose set forth comprising a receptacle having a bottom outlet, an inner cup removably attached to the lower portion of said receptacle and having a plurality of side holes at different distances from the bottom, an outer cup surrounding said inner cup and having a drip tube in its bottom and one or more openings in its side, and a liquid-transferring wick connecting the two cups through one of the holes in the side of the inner cup.

9. A device for the purpose set forth comprising a bracket, an outer cup and a receptacle independently engaged by said bracket and detachable from said bracket and from each other, said receptacle having a bottom outlet, an inner cup detachably mounted upon the lower portion of the said receptacle, means for conveying liquid from said inner cup into said outer cup, and means for discharging liquid from the outer cup.

10. A device for the purpose set forth comprising a receptacle for liquid having a bottom outlet, an inner cup detachably mounted upon said receptacle, an outer cup surrounding said inner cup, means for transferring liquid from the inner cup to the outer cup, and a bracket independently attached to said receptacle and to said outer cup.

11. A device for the purpose set forth comprising a bracket, a glass receptacle having substantially all of its outer surface exposed and having an open bottom, an outer cup that supports said receptacle and is supported by the lower end of said bracket, an inner cup detachably mounted upon said receptacle and inclosed by said outer cup and which surrounds the opening in the bottom of the receptacle and means for transferring liquid from the inner cup to the outer cup.

12. A device for the purpose set forth comprising a bracket, an outer cup carried by the lower end of said bracket, a receptacle supported by said outer cup and having the lower end thereof provided with an outlet, an inner cup detachably mounted upon the lower portion of said receptacle, means for conveying the contents of said inner cup into said outer cup, and means for detachably connecting the upper end of said receptacle to the upper end of said bracket.

13. A device for the purpose set forth comprising a bracket, an outer cup and a receptacle independently attached to said bracket, said receptacle having a bottom outlet, an inner cup detachably mounted upon said receptacle and surrounded by the outer cup means for transferring liquid from said inner cup to said outer cup, means for varying the rate of such transfer, and means for discharging liquid from the outer cup.

In testimony whereof, we have hereunto set our hands.

JOSEPH WILLIAMS.
WILLIAM H. WILLIAMS.
EDWARD R. WILLIAMS.

Witnesses:
JOHN G. WALTER,
EDWARD J. WALTER.

Copies of this patent may be obtained for five cents each, by addressing the "Commissioner of Patents, Washington, D. C."

Correction in Reissue Letters Patent No. 13,314.

It is hereby certified that in Letters Patent Reissue No. 13,314, granted November 14, 1911, upon the application of Joseph Williams, William H. Williams, and Edward R. Williams, of Sharpsburg, Pennsylvania, for an improvement in "Disinfectors and Deodorizers," an error appears in the printed specification requiring correction as follows: Page 3, lines 86-87, the word "detacholly" should read *detachably;* and that the said Letters Patent should be read with this correction therein that the same may conform to the record of the case in the Patent Office.

Signed and sealed this 26th day of December, A. D., 1911.

[SEAL.]

C. C. BILLINGS,

*Acting Commissioner of Patents.*